United States Patent [19]
Pernet

[11] Patent Number: 5,860,821
[45] Date of Patent: Jan. 19, 1999

[54] CONTACT STRIP AND CARD CONNECTOR INCLUDING SAME

[75] Inventor: Michel Pernet, Pontarlier, France

[73] Assignee: Framatome Connectors International, Courbevoie, France

[21] Appl. No.: 822,000

[22] Filed: Mar. 24, 1997

Related U.S. Application Data

[63] Continuation of Ser. No. 365,606, Dec. 27, 1994, abandoned.

[30] Foreign Application Priority Data

Dec. 27, 1993 [FR] France ................................. 93 15682

[51] Int. Cl.[6] .................................................. H01R 29/00
[52] U.S. Cl. ........................... 439/188; 439/669; 439/885
[58] Field of Search ..................................... 439/180, 188, 439/507, 509, 668, 669, 620, 885

[56] References Cited

U.S. PATENT DOCUMENTS 4,874,333  10/1989  Reed ........................................ 439/188
5,098,306  3/1992  Noschese et al. ....................... 439/188
5,334,827  8/1994  Bleier et al. ............................. 439/188

FOREIGN PATENT DOCUMENTS 366 513     5/1989    European Pat. Off. .
542 231    11/1992    European Pat. Off. .
2 623 314  11/1987    France .

OTHER PUBLICATIONS

PCT/EP90/01608.

*Primary Examiner*—J. J. Swann
*Attorney, Agent, or Firm*—Pollock, Vande Sande & Priddy

[57] ABSTRACT

A contact strip includes adjacent contact blade members and at least one pair of adjacent contact blade members each having a horizontal axis and a first of which blade members has a greater developed length than the second of the blade members and a distal extension extending towards the second blade member. The first blade member has a projecting region, the distal extension overlapping the second blade member.

6 Claims, 2 Drawing Sheets

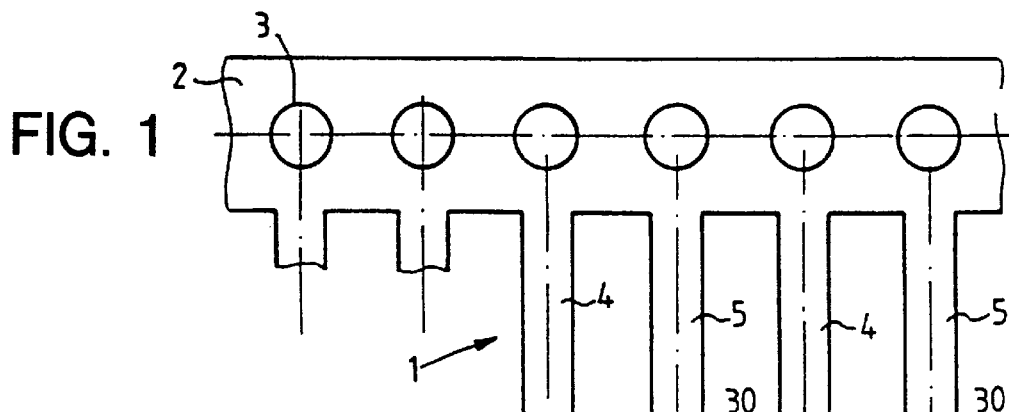
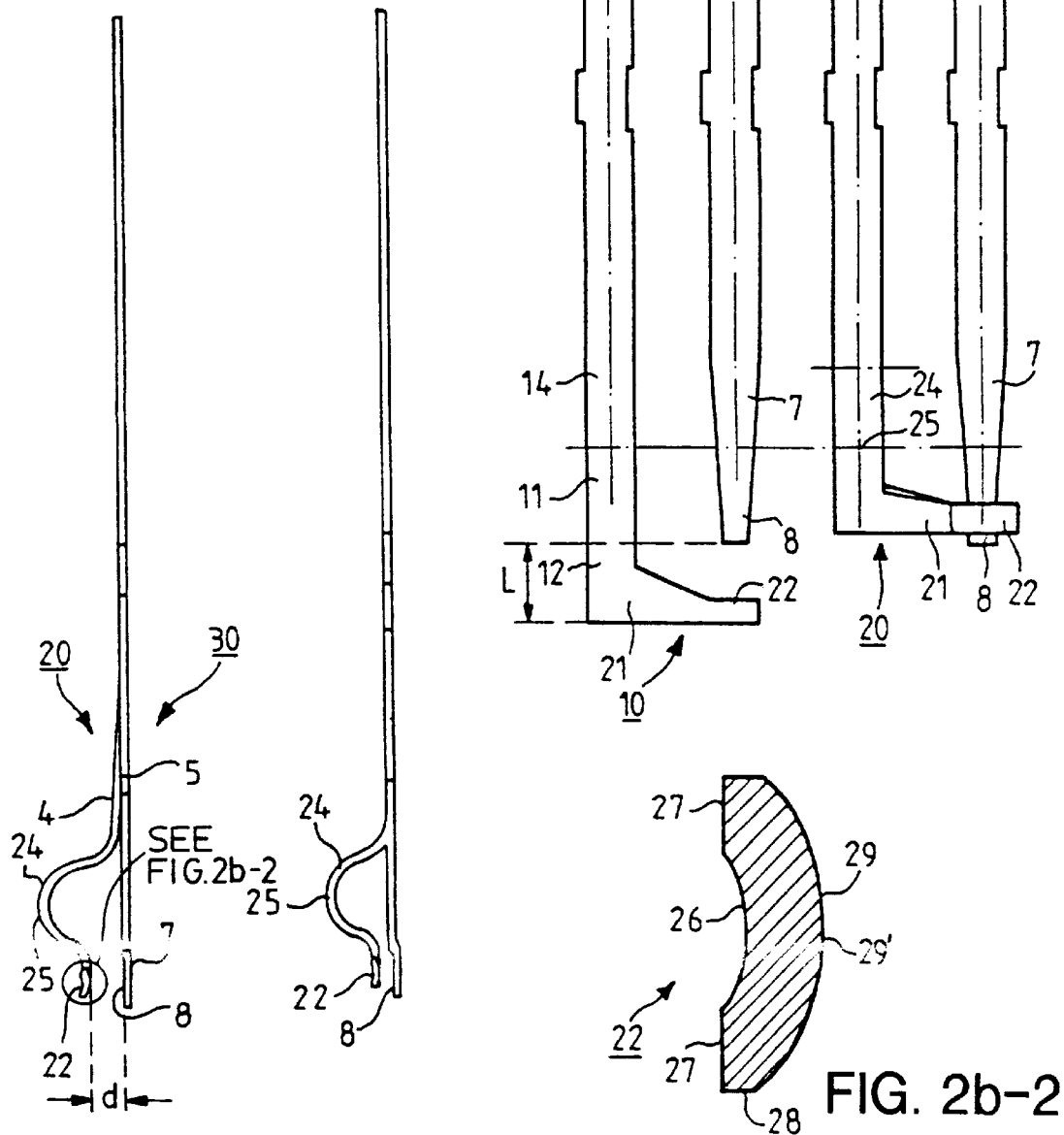

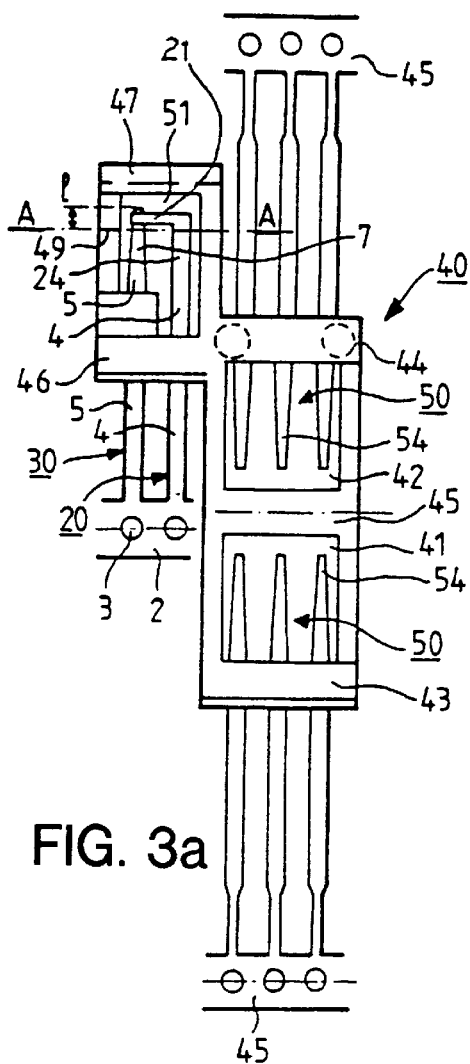
FIG. 3a
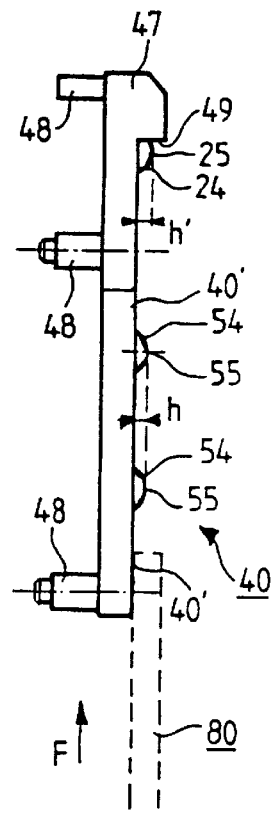
FIG. 3b
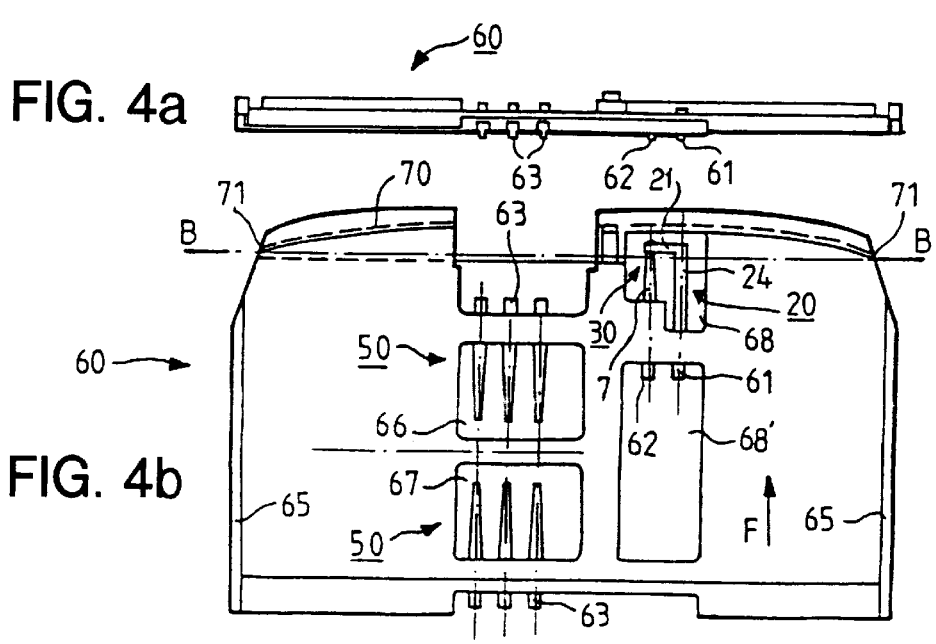
FIG. 4a
FIG. 4b

CONTACT STRIP AND CARD CONNECTOR INCLUDING SAME

This application is a continuation of U.S. patent application Ser. No. 08/365,606, filed Dec. 27, 1994, now abandoned.

BACKGROUND OF THE INVENTION

1. Field of the Invention

The present invention concerns a contact strip comprising adjacent contact blade members.

2. Description of the Prior Art

Card connectors, such as connectors for electronic circuit cards and smart cards, usually include a switch whose function is to sense the presence of the card and in particular to sense when the card reaches its end of travel position.

Connectors of this kind are described in European Patent application EP 366 513 (ITT) and in French Patent application FR 2 623 314 (ALCATEL CIT), for example. These patents describe a movable blade member spring-loaded in a direction opposite to the translational movement of inserting a card in a card reader, an edge of the card bearing against the blade member and moving it against the action of the spring-loading means.

Each of the travel sensors of the above type have the disadvantage of taking up room on one edge of the card connector, and in particular of increasing its thickness, and of being able to sense an end-of-travel position only in a reader into which the card is inserted horizontally.

An object of the present invention is a contact strip having contacts for sensing the presence of a card or for sensing the end of travel position of a card, whether the card is inserted by translatory movement or by closing a cover pivoted to a contact frame comprising the contact members.

SUMMARY OF THE INVENTION

Accordingly, the present invention concerns a contact strip including adjacent contact blade members, and it includes at least one pair of adjacent contact blade members each having a horizontal axis, a first of the blade members having a greater developed length than a second blade member and a distal extension in the direction towards the second blade member. When bent to shape, the contact strip forms a finished strip ready to be molded in and in which the first blade member has a projecting region, the distal end overlapping the second blade member and preferably a distal end of the second blade member.

The projecting region is advantageously near the distal extension.

The distal extension can be a finger having a longitudinal axis substantially perpendicular to the longitudinal axis of the second metal blade member.

The invention also concerns a connector for a flat support, such as an electronic circuit card, including a switch for sensing the presence of the flat support. The switch includes a pair of adjacent blade members each having a horizontal axis, a first blade member having a greater developed length than the second blade member and a distal extension in the direction towards the second blade member and overlapping with the second blade member, the first blade member having a projecting region intersecting a locating plane for the flat support so that, when the flat support is in the locating plane and in a nominal connection position, the distal extension is in electrical and mechanical contact with the second blade member. The distal extension preferably overlaps a distal end of the second blade member.

The projecting region can be near the distal extension.

The connector advantageously includes an abutment region to form an abutment for the flat support along an abutment line, the projecting region being near the abutment line so that the switch forms a sensor for sensing the end-of-travel position of the flat support.

The distal extension can be a finger having a longitudinal axis substantially perpendicular to the longitudinal axis of the second metal blade member.

In a preferred embodiment of the invention, the distal extension is on the downstream side of the card abutment line relative to the card insertion direction.

Other features and advantages of the invention will emerge more clearly from a reading of the following description given by way of example with reference to the drawings.

BRIEF DESCRIPTION OF THE DRAWINGS

FIG. 1 shows a contact strip of the invention, showing in the lefthand part a pair of adjacent contacts in the left-hand side showing a pair of adjacent contacts before shaping, and the right-hand side showing a pair of.

FIGS. 2a and 2b show a side view of contact blade members of the invention during two consecutive stages of shaping, FIG. 2b showing the final shape of the contact.

FIGS. 3a and 3b respectively are a top plan view and a side view of a contact frame including a contact strip of the invention before trimming of the edge strips.

FIGS. 4a and 4b respectively are a side view and a top plan view of a card connector of the invention.

DETAILED DESCRIPTION OF THE INVENTION

FIG. 1 shows a contact strip 1 of the invention having an edge strip 2 and handling openings 3 together with pairs of contacts in the form of blade members 4 and 5, including an active contact blade member 10 before bending to shape and 20 after bending to shape, and a passive blade member 30 with a distal end 8 with which a lug 21 having a contact end 22 establishes electrical contact when a flat support such as a card applies a bearing force to the crook-shaped region 24 of the active blade member 20.

Referring to FIG. 1, the blade member 10 as cut from the contact strip 1 without further processing has a distal end 12 featuring the aforementioned lug 21, which projects by a length L beyond the distal end 8 of the passive blade member 30. After bending to shape, the active blade member 20 has a crook-shaped region 24 with a summit 25, this region 24 being preferably in the immediate vicinity of the lug 21. After bending to shape, the distal end 22 of lug 21 extending towards the passive blade member 30 overlaps the distal end 8 of the passive blade member 30. The distal end 8 of the passive blade member 30 merges with the main portion 5 of the passive blade member 30 in a region 7 whose width decreases towards the distal end 8, with the result that this end region 7 is more elastic than the remainder of the blade member 30 which is intended to be embedded in a molded contact frame.

FIGS. 2a and 2b show the bending to shape of the blade member 20 in two stages. In the first (or bending proper) stage, the crook-shaped region 24 is formed and the end portion 22 of the lug 21 is slightly curved.

In the second stage, the contact 20 is displaced slightly out of the plane of the blade member 30 in order to define a given travel for the sensing contact.

FIG. 2b shows the finished blade member 20. As shown in the detail inside the circle, the end section 22 has a convex region 29 whose summit 29' defines a point of contact with the convex distal region 8 along an axis perpendicular to the region 29 (see FIGS. 2a and 2b). Opposite the convex region 29, the end region 22 has a concave region 26 merging at two sides 27 with lateral edges 28 of the end region 22 of the lug 21.

FIGS. 3a and 3b show the contact strip mounted in a contact frame 40 which also has contact members 50 disposed in two rows and adapted in the conventional manner to make electrical contact with the electronic circuit card through bearing contact between conductive regions of the card and the summits 55 of the crook-shaped regions 54 of the contacts 50. The contacts 50 are disposed in respective openings 41 and 42 of the frame 40, and the blade members 20 and 30 are disposed in an opening 51 in the frame 40. The blade members 20 and 30 are embedded in the contact frame so that the merging regions 7 and 24 and a small portion of the blade members 5 are left free, the latter portion of the blade members 5 defining the output contacts 61 and 62 of the card sensing switch after bending to shape and removal of the edge strips 2.

The card 80 is inserted in the direction of the arrow F parallel to an upper side 40' of the contact frame 40. This side 40' constitutes a card locating plane. The pair of blade members 20 and 30 of the invention is advantageously used not only to sense the presence of the card but also to sense the end-of-travel position of the card. To this end, the crook-shaped region 24 is near an abutment side 49 of a lip 47 at the side of the housing 51, defining a card abutment line A—A. The summits 55 of the crooks 54 of the contact members 50 project above the plane 40' to a height h. The summits 25 of the crook 24 project above the plane 40' to a height h'. FIG. 3b shows these heights as equal. If the contact frame is to be used in a frame connector of the type in which the card is placed in a lid which pivots relative to the contact frame and which is then closed, it is clearly advantageous for the height h' to be less than the height h, which ensures a secure contact, the distance "d" between the contact regions 22 and 8 being less than h–h'.

If the contact frame is used with a pivoting cover card connector, the pair of contacts 20 and 30 can sense an end-of-travel position regardless of its position in the contact frame.

In FIGS. 3a and 3b the contact frame 40 has studs 48 for inserting into a card connector to mount the contact frame on the latter.

FIGS. 4a and 4b show a connector 60 molded onto the contacts. The contacts 50 having bent pins 63 are disposed in two rows in respective openings 66 and 67, and the sensing blade members 20 and 30 are disposed in an opening 68 with their bent contact pins 61 and 62 in an opening 68'. For insertion of the card in the direction shown by the arrow F, the front lip 70, which is curved, has two extreme lateral points 71 defining a card abutment line B—B. As in FIG. 3, the lug 21 is beyond the line B—B relative to the direction of insertion F of the card 80, which projects the lug 21 during insertion, contact being made through bearing engagement with the crook-shaped region 24.

There is claimed:

1. In a connector for a flat support such as an electronic circuit card including a switch adapted to sense a presence or an end-of-travel position of said flat support, the improvement wherein said switch includes a pair of adjacent blade members each having a horizontal axis, a first blade member of said pair having a developed length greater than a second blade member of said pair, and said first blade member having a distal extension extending towards said second blade member and overlapping with said second blade member, said first blade member having a projecting region intersecting a locating plane for said flat support so that, when said flat support is in said locating plane and in a nominal connection position, said distal extension is in electrical and mechanical contact with said second blade member.

2. The connector according to claim 1, wherein said distal extension overlaps a distal end of said second blade member.

3. The connector according to claim 1, wherein said projecting region is near said distal extension.

4. The connector according to claim 1, including an abutment region for forming an abutment for said flat support along an abutment line and wherein said projecting region is disposed near said abutment line so that said switch forms an end-of-travel sensor for said flat support.

5. The connector according to claim 1, wherein said distal extension comprises a finger having a longitudinal axis substantially perpendicular to the longitudinal axis of said second metal blade member.

6. The connector according to claim 1, wherein said distal extension is on a downstream side of an abutment line of a card relative to a direction of insertion of said card.

* * * * *